US012781002B2

(12) United States Patent

Kuroki et al.

(10) Patent No.: US 12,781,002 B2
(45) Date of Patent: Nov. 3, 2026

(54) FLUORINE RESIN FILM, MOLDED RUBBER BODY, AND METHOD FOR MANUFACTURING MOLDED RUBBER BODY

(71) Applicants: NITTO DENKO CORPORATION, Osaka (JP); DAIKYO SEIKO, LTD., Tochigi (JP)

(72) Inventors: Yuta Kuroki, Osaka (JP); Narumi Ueda, Osaka (JP); Kurato Akiba, Osaka (JP); Keiko Fujiwara, Osaka (JP)

(73) Assignees: NITTO DENKO CORPORATION, Osaka (JP); DAIKYO SEIKO, LTD., Tochigi (JP)

( * ) Notice: Subject to any disclaimer, the term of this patent is extended or adjusted under 35 U.S.C. 154(b) by 312 days.

(21) Appl. No.: 18/034,977

(22) PCT Filed: Aug. 5, 2021

(86) PCT No.: PCT/JP2021/029234
§ 371 (c)(1),
(2) Date: May 2, 2023

(87) PCT Pub. No.: WO2022/102180
PCT Pub. Date: May 19, 2022

(65) Prior Publication Data

US 2023/0416477 A1 Dec. 28, 2023

(30) Foreign Application Priority Data

Nov. 10, 2020 (JP) ................................ 2020-187293

(51) Int. Cl.
*C08J 5/18* (2006.01)

(52) U.S. Cl.
CPC ............. *C08J 5/18* (2013.01); *C08J 2323/08* (2013.01); *C08J 2327/18* (2013.01)

(58) Field of Classification Search
CPC ....... C08J 5/18; C08J 2323/08; C08J 2327/18
See application file for complete search history.

(56) References Cited

U.S. PATENT DOCUMENTS 5,845,797 A * 12/1998 Sudo .................. B65D 39/0011 215/355
6,528,007 B1 * 3/2003 Sudo .......................... C08J 7/08 264/491

(Continued)

FOREIGN PATENT DOCUMENTS

EP 205 312 A1 12/1986
JP 55-98854 U 7/1980

(Continued)

OTHER PUBLICATIONS

JP 2004305307 A Machine Translation (Year: 2004).*

(Continued)

*Primary Examiner* — Travis M Figg
(74) *Attorney, Agent, or Firm* — Greenblum & Bernstein, P.L.C.

(57) ABSTRACT

A fluorine resin film to be provided includes a fluorine resin, wherein the fluorine resin film has an average value of 1200% or more of a tensile elongation at break in a first direction and a tensile elongation at break in a second direction under a 180° C. atmosphere, the first direction and the second direction being in-plane directions and orthogonal to each other. This fluorine resin film can be used as a coating film for coating the surface of a rubber-containing substrate included in a molded rubber body and is suitable for manufacturing a molded rubber body having a surface coated with the film.

11 Claims, 5 Drawing Sheets

(56) References Cited

U.S. PATENT DOCUMENTS

| | | | | |
|---|---|---|---|---|
| 2010/0206836 | A1* | 8/2010 | Koshidaka | B65D 39/0023 215/355 |
| 2012/0067888 | A1* | 3/2012 | Kawachi | B65D 51/002 220/233 |
| 2012/0148820 | A1 | 6/2012 | Okuya | |
| 2013/0119011 | A1* | 5/2013 | Kawachi | B29C 45/14811 215/355 |
| 2016/0189986 | A1 | 6/2016 | Kasai et al. | |
| 2017/0207105 | A1 | 7/2017 | Kasai et al. | |
| 2018/0186914 | A1* | 7/2018 | Taguchi | B65D 39/0005 |
| 2019/0085142 | A1 | 3/2019 | Kasai et al. | |

FOREIGN PATENT DOCUMENTS

| | | | | | |
|---|---|---|---|---|---|
| JP | 61-277445 | A | | 12/1986 | |
| JP | S61277445 | A | * | 12/1986 | B29C 59/14 |
| JP | 62-139668 | A | | 6/1987 | |
| JP | 2002-361667 | A | | 12/2002 | |
| JP | 2004-248985 | A | | 9/2004 | |
| JP | 2004305307 | A | * | 11/2004 | A61M 5/31513 |
| JP | 2015-157488 | A | | 9/2015 | |
| JP | 2016-215602 | A | | 12/2016 | |
| WO | WO-2009051282 | A1 | * | 4/2009 | B65D 39/0023 |
| WO | 2011/037034 | A1 | | 3/2011 | |
| WO | 2016/080309 | A1 | | 5/2016 | |
| WO | 2016/093178 | A1 | | 6/2016 | |
| WO | 2017/082315 | A1 | | 5/2017 | |
| WO | 2018/008563 | A1 | | 1/2018 | |

OTHER PUBLICATIONS

Office Action that issued in corresponding Taiwanese Patent Application No. 110136895, dated Oct. 29, 2024, along with English translation thereof.

International Search Report and Written Opinion of the International Searching Authority issued in International Patent Application No. PCT/JP2021/029234, mailed Oct. 26, 2021, along with an English translation thereof.

Office Action, along with English translation thereof, and English Translation of Search Report that issued in corresponding Chinese Patent Application No. 202180075821.X, dated Jun. 18, 2025, along with English translations thereof.

Office Action that issued in corresponding Taiwanese Patent Application No. 110136895, dated Jun. 9, 2025, along with English translation.

Office Action that issued in corresponding Chinese Patent Application No. 202180075821.X, dated Jan. 15, 2026, along with English translation thereof.

Office Action that issued in corresponding Taiwanese Patent Application No. 110136895, dated Jan. 16, 2026, along with English translations thereof.

Office Action that issued in corresponding Japanese Patent Application No. 2022-561276, dated Nov. 25, 2025, along with English translation thereof.

Office Action that issued in corresponding Japanese Patent Application No. 2022-561276, dated Jun. 10, 2025, along with English translation.

* cited by examiner

FLUORINE RESIN FILM, MOLDED RUBBER BODY, AND METHOD FOR MANUFACTURING MOLDED RUBBER BODY

TECHNICAL FIELD

The present invention relates to a fluorine resin film, a molded rubber body, and a method for manufacturing a molded rubber body.

BACKGROUND ART

Fluorine resin films are chemically stable, and accordingly are used as films for coating the surface of a rubber-containing substrate. Molded rubber bodies including a rubber-containing substrate and a fluorine resin film coating the surface of the rubber-containing substrate are used as diaphragms, rollers, sealing members, and the like.

Patent Literature 1 discloses a diaphragm having a surface coated with a fluorine resin film. The diaphragm of Patent Literature 1 is highly durable to ozone in the atmosphere, the fuel, and so on.

CITATION LIST

Patent Literature

Patent Literature 1: Microfilm of Japanese Utility Model Application No. S53(1978)-182502 (JP S55(1980)-98854 U)

SUMMARY OF INVENTION

Technical Problem

By performing a shaping process of a rubber in a state where a fluorine resin film is placed in a mold, it is possible to carry on formation of a rubber-containing substrate and coating with the fluorine resin film simultaneously, thereby efficiently manufacturing a molded rubber body. However, in the above shaping process, a tear sometimes occurs in the fluorine resin film coating the rubber-containing substrate. In addition, according to studies by the present inventors, the tear tends to occur especially in the case where the fluorine resin film coats the surface of a protrusion protruding from the base portion of the rubber-containing substrate.

The present invention aims to provide a fluorine resin film that can be used as a coating film for coating the surface of a rubber-containing substrate included in a molded rubber body and is suitable for manufacturing a molded rubber body having a surface coated with the film.

Solution to Problem

The present invention provides a fluorine resin film including a fluorine resin, wherein the fluorine resin film has an average value of 1200% or more of a tensile elongation at break in a first direction and a tensile elongation at break in a second direction under a 180° C. atmosphere, the first direction and the second direction being in-plane directions and orthogonal to each other.

Another aspect of the present invention provides a molded rubber body including:

a rubber-containing substrate; and a resin film, wherein the rubber-containing substrate has a surface coated with the resin film, and the resin film is the fluorine resin film according to the present invention.

Another aspect of the present invention provides a method for manufacturing a molded rubber body including a resin film and a rubber-containing substrate having a surface coated with the resin film, the method including performing a shaping process of a rubber in a state where the resin film is placed in a mold, thereby obtaining the molded rubber body, wherein the resin film is the fluorine resin film according to the present invention.

Another aspect of the present invention provides a method for manufacturing a molded rubber body including a resin film and a rubber-containing substrate having a surface coated with the resin film, wherein in the molded rubber body, the resin film is a fluorine resin film and has no tear, the surface includes a surface of a protrusion protruding from a base portion of the rubber-containing substrate, the protrusion has a height of 10 mm or more, and the resin film coats the protrusion from a top portion of the protrusion in a height direction of the protrusion, and the method includes performing a shaping process of a rubber in a state where the fluorine resin film according to the present invention is placed in a mold, thereby obtaining the molded rubber body.

Another aspect of the present invention provides a method for manufacturing a molded rubber body including a resin film and a rubber-containing substrate having a surface coated with the resin film, wherein in the molded rubber body, the resin film is a fluorine resin film and has no tear, the surface includes a surface of a protrusion protruding from a base portion of the rubber-containing substrate, the protrusion has a height of 10 mm or more, and the resin film coats the protrusion from a top portion of the protrusion in a height direction of the protrusion, and the method includes performing a shaping process of a rubber in a state where the resin film is placed in a mold, thereby obtaining the molded rubber body, and the resin film used is a resin film having a tensile elongation at break such that no tear occurs in changing the resin film from a film state to a shape conforming to a recess of the mold in a depth direction of the recess of the mold, the recess corresponding to the protrusion.

Advantageous Effects of Invention

The fluorine resin film of the present invention, which has the above tensile elongation at break, is suitable for manufacturing a molded rubber body having a surface coated with the film.

DESCRIPTION OF EMBODIMENT

An embodiment of the present invention will be described below with reference to the drawings. The present invention is not limited to the following embodiment.

[Fluorine Resin Film]

Figure 1:
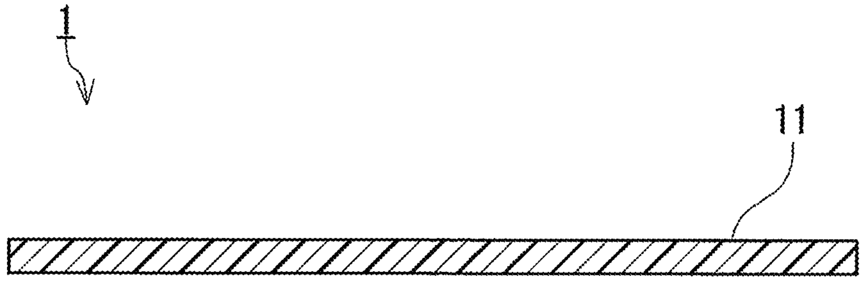
FIG. 1 is a cross-sectional view schematically showing an example of a fluorine resin film of the present invention.

FIG. 1 shows a fluorine resin film of the present embodiment. The fluorine resin film 1 in FIG. 1 contains a fluorine resin. The fluorine resin film 1 has an average value of 1200% or more of the tensile elongation at break in a first direction and the tensile elongation at break in a second direction under a 180° C. atmosphere (hereinafter this average value is referred to as the average elongation). The first direction and the second direction are in-plane directions and orthogonal to each other. According to the fluorine resin film 1, it is possible to reduce the occurrence of a tear in the film 1 in the above rubber shaping process. Note that 180° C. corresponds to a typical process temperature in the rubber shaping process.

The average elongation may be 1250% or more, 1300% or more, 1350% or more, 1400% or more, 1450% or more, 1500% or more, 1550% or more, 1600% or more, 1650% or more, or even 1700% or more. The upper limit for the average elongation is, for example, 1800% or less.

The first direction is, for example, the MD. The second direction is, for example, the TD. The MD is typically the winding direction during film formation of the fluorine resin film 1. The TD is typically an in-plane direction perpendicular to the above winding direction of the fluorine resin film 1. In the strip-shaped fluorine resin film 1, the first direction and the second direction may be the longitudinal direction and the width direction, respectively.

The fluorine resin film 1 may have a tensile strength of 7.0 MPa or more, 7.5 MPa or more, 8.0 MPa or more, 8.5 MPa or more, 9.0 MPa or more, or even 9.5 MPa or more in the first direction and/or the second direction under a 180° C. atmosphere. An appropriate control of the tensile strength can contribute to a more reliable reduction of the occurrence of a tear above. However, it is often difficult to achieve both high tensile strength and high tensile elongation at break. The upper limit for the tensile strength is, for example, 20.0 MPa or less, and may be 17.0 MPa or less, 16.0 MPa or less, 15.0 MPa or less, 14.0 MPa or less, 13.0 MPa or less, or even 12.0 MPa or less.

The tensile elongation at break and the tensile strength can be evaluated by a tensile test on the fluorine resin film 1.

The fluorine resin film 1 in FIG. 1 has a surface subjected to a modification treatment (hereinafter referred to as a modification-treated surface) 11. By using the fluorine resin film 1 so that the modification-treated surface 11 is in contact with the rubber-containing substrate, the adhesion of the fluorine resin film 1 to the rubber-containing substrate can be enhanced.

The modification-treated surface 11 may have an adhesiveness, expressed as the peel strength evaluated by a 180° peel test, of 4.0 N/19 mm or more, 4.5 N/19 mm or more, 5.0 N/19 mm or more, 5.5 N/19 mm or more, 6.0 N/19 mm or more, 6.5 N/19 mm or more, 7.0 N/19 mm or more, or even 7.5 N/19 mm or more. The 180° peel test is performed by attaching the fluorine resin film 1 and an adhesive tape (No. 31B manufactured by NITTO DENKO CORPORATION, 80 μm thick) to each other so that the adhesive surface of the adhesive tape and the modification-treated surface 11 are in contact with each other, and then peeling off the adhesive tape from the fluorine resin film 1. The upper limit for the adhesiveness of the modification-treated surface 11 is, for example, 15.0 N/19 mm or less expressed as the above peel strength. Note that No. 31B has a sufficient adhesive force for evaluating the above peel strength.

The fluorine resin film 1 in FIG. 1 has the modification-treated surface 11 on one of the principal surfaces. The fluorine resin film 1 may have the modification-treated surface 11 on each of both the principal surfaces. In the case where the fluorine resin film 1 has the two or more modification-treated surfaces 11, the modification-treated surfaces 11 may be the same or different from each other in terms of adhesiveness.

The fluorine resin film 1 in FIG. 1 has the modification-treated surface 11 on the entire one principal surface. The fluorine resin film 1 may have the modification-treated surface 11 on only a part of the principal surface. Alternatively, the fluorine resin film 1 may have the two or more modification-treated surfaces 11 on one principal surface.

The fluorine resin film 1 has a thickness of, for example, 10 to 300 μm, and may have a thickness of 30 to 250 μm or even 50 to 200 μm.

The fluorine resin film 1 in FIG. 1 is single-layered. The fluorine resin film 1 may be any laminate of two or more layers as long as the fluorine resin film 1 has the above tensile elongation at break.

An example of the fluorine resin is at least one selected from the group consisting of an ethylene-tetrafluoroethylene copolymer (ETFE), a tetrafluoroethylene-hexafluoropropylene copolymer (FEP), a tetrafluoroethylene-perfluoroalkoxyethylene copolymer (PFA), polychlorotrifluoroethylene (PCTFE), and polytetrafluoroethylene (PTFE). The fluorine resin may be at least one selected from the group consisting of ETFE, FEP, and PFA, or may be ETFE.

The fluorine resin (excluding PTFE having an extremely high melt viscosity and thus having difficulty in evaluation of melt flow rate) has a melt flow rate (hereinafter referred to as an MFR) of, for example, 30 g/10 min or less, and the MFR may be 28 g/10 min or less, 25 g/10 min or less, or even 22 g/10 min or less. The lower limit for the MFR is, for example, 0.5 g/10 min or more, and may be 1 g/10 min or more, 1.5 g/10 min or more, 2 g/10 min or more, 2.5 g/10 min or more, 3 g/10 min or more, 3.5 g/10 min or more, 4 g/10 min or more, 4.5 g/10 min or more, 5 g/10 min or more, or even 7 g/10 min or more. An appropriate control of the MFR can contribute to a more reliable reduction of the occurrence of a tear above. The melting temperature and load for evaluating the MFR can be defined according to the type of fluorine resin, as shown in Table 1 below. The magnitude of the melting temperature for each of the resins corresponds to the magnitude of a typical temperature (thermoforming temperature) for thermoforming the resin.

TABLE 1

| | Melting temperature (° C.) | Load (kg) |
|---|---|---|
| ETFE | 297 | 5 |
| FEP | 372 | 5 |
| PFA | 372 | 2 |
| PCTFE | 265 | 31.6 |

The fluorine resin has a melting point of, for example, 250° C. or less evaluated by differential scanning calorimetry (hereinafter referred to as DSC), and the melting point may be 245° C. or less, 240° C. or less, 235° C. or less, or even 230° C. or less. The lower limit for the melting point is, for example, 200° C. or more, and may be 205° C. or more. An appropriate control of the melting point can contribute to a more reliable reduction of the occurrence of a tear above. As used herein, the melting point of the fluorine resin is defined as the temperature of the maximum endothermic peak resulting from the melting of the fluorine resin (melting peak temperature), where the temperature of the maximum endothermic peak is measured by DSC in raising the fluorine resin in temperature at a constant rate of temperature rise (10° C./min). However, to cancel the thermal history in the film molding and thus to confirm the characteristics unique to the resin, the melting point is evaluated by the second run of DSC. The melting point of the fluorine resin varies, for example, depending on the molecular weight, the molecular weight distribution, the polymerization method, the history of polymerization, and the like.

The fluorine resin film 1 may contain a fluorine resin as its main component. The main component as used herein refers to a component having the largest content. The content of the fluorine resin in the fluorine resin film 1 is, for example, 50 weight % or more, and may be 60 weight % or more, 70 weight % or more, 80 weight % or more, 90 weight % or more, 95 weight % or more, or even 99 weight % or more. The fluorine resin film 1 may be formed of the fluorine resin. The fluorine resin film 1 can contain two or more fluorine resins.

The fluorine resin film 1 may contain an additional material in addition to the fluorine resin. An example of the additional material in the fluorine resin film 1 is a resin other than the fluorine resin. Examples of the resin include a polyolefin such as polyethylene and polypropylene and a polyvinylidene chloride. The content of the additional material in the fluorine resin film 1 is, for example, 20 weight % or less, and may be 10 weight % or less, 5 weight % or less, 3 weight % or less, or even 1 weight % or less.

The fluorine resin film 1 is in the shape of, for example, a polygon such as a square or a rectangle, a circle, an oval, or a strip. The polygon may have a rounded corner. However, the shape of the fluorine resin film 1 is not limited to the above examples. The polygonal-shaped, circular-shaped, or oval-shaped fluorine resin film 1 can be distributed in the form of a sheet, and the strip-shaped fluorine resin film 1 can be distributed in the form of a wound body (roll) wound around a core. It is possible to set, to any values, the width of the strip-shaped fluorine resin film 1 and the width of the wound body formed of the strip-shaped wound fluorine resin film 1.

The fluorine resin film 1 is usually non-porous. The fluorine resin film 1 may be an imperforate film having no hole communicating between both the principal surfaces at least in the region of use.

The fluorine resin film 1 may be an impermeable film that does not allow a fluid such as water, an aqueous solution, oil, and an organic liquid to permeate therethrough in the thickness direction because of high liquid repellency (water repellency and oil repellency) of the fluorine resin. Further, the fluorine resin film 1 may be an insulating film (non-conductive film) because of high insulating properties of the fluorine resin. The insulating properties are expressed, for example, as a surface resistivity of $1\times10^{14}\Omega/\square$ or more.

The method for manufacturing the fluorine resin film 1 is not limited. The fluorine resin film 1 can be manufactured by various film molding methods such as a melt extrusion method, a cutting method, and a casting method. The mechanical properties such as the tensile elongation at break can be adjusted by controlling the composition of the fluorine resin film 1, performing a mechanical treatment, such as stretching and rolling, on the film, and so on. The fluorine resin film 1 having the modification-treated surface 11 can be manufactured, for example, by subjecting an original film containing a fluorine resin to a modification treatment. An example of the above method will be described below. However, the method for manufacturing the fluorine resin film 1 having the modification-treated surface 11 is not limited to the following example.

The original film is typically a film having the same configuration as that of the fluorine resin film 1 except that the original film does not have the modification-treated surface 11.

Examples of the modification treatment on the original film include a sputter etching treatment, an ion beam treatment, a laser etching treatment, a sandblasting treatment, and a treatment with sandpaper. However, the modification treatment is not limited to the above examples as long as the modification-treated surface 11 is formed.

The modification treatment may be the sputter etching treatment or the ion beam treatment in view of their capability of efficiently forming the modification-treated surface 11, or may be the sputter etching treatment.

The sputter etching treatment can be performed typically by applying a high-frequency voltage to the original film in a state where a chamber housing the original film is depressurized and an ambient gas is introduced into the chamber. The application of the high-frequency voltage can be performed, for example, by using a cathode in contact with the original film and an anode away from the original film. In this case, the modification-treated surface 11 is formed on the principal surface on the anode side, which is an exposed surface of the original film. A known apparatus can be used for the sputter etching treatment.

Examples of the ambient gas include a noble gas such as helium, neon, and argon, an inert gas such as nitrogen, and a reactive gas such as oxygen and hydrogen. The ambient gas may be at least one selected from the group consisting of argon and oxygen in view of their capability of efficiently forming the modification-treated surface 11, or may be oxygen. Only one ambient gas may be used.

The frequency of the high-frequency voltage is, for example, 1 to 100 MHz, and may be 5 to 50 MHz. The pressure in the chamber during the treatment is, for example, 0.05 to 200 Pa, and may be 0.5 to 100 Pa.

The amount of energy for the sputter etching treatment (the product of the electric power per unit area to be applied to the original film and the treatment time) is, for example, 0.1 to 100 $J/cm^2$, and may be 0.1 to 50 $J/cm^2$, 0.1 to 40 $J/cm^2$, or even 0.1 to 30 $J/cm^2$.

The sputter etching treatment may be performed as batch processing or continuous processing. An example of the continuous processing will be described with reference to FIG. 2.

Figure 2:
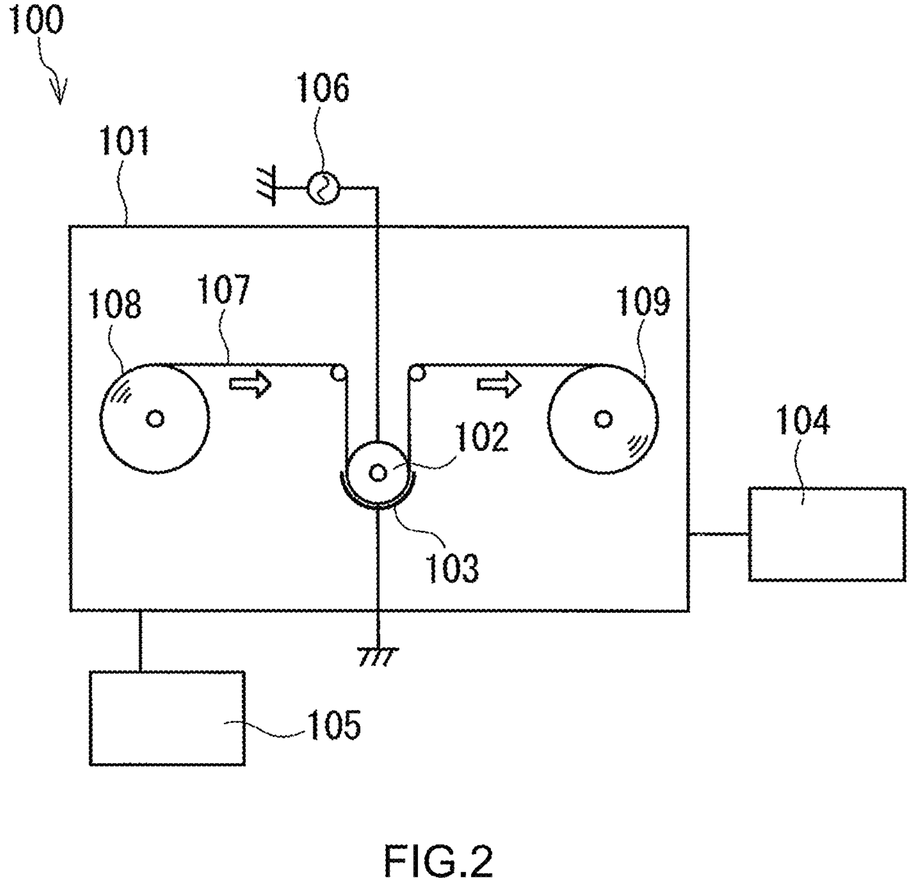
FIG. 2 is a schematic view showing an example of an apparatus capable of manufacturing the fluorine resin film of the present invention.

FIG. 2 shows an example of a continuous processing apparatus. A processing apparatus 100 in FIG. 2 includes a chamber 101, and a roll electrode 102 and a curved plate-shaped electrode 103 that are disposed in the chamber 101. To the chamber 101, a decompression device 104 for decompressing the chamber 101 and a gas supply device 105 for supplying an ambient gas to the chamber 101 are connected. The roll electrode 102 is connected to a high-frequency power source 106, and the curved plate-shaped electrode 103 is grounded. An original film 107 is in the shape of a strip and wound around a feed roll 108. The original film 107 is continuously fed from the feed roll 108, and is passed between the roll electrode 102 and the curved plate-shaped electrode 103 along the roll electrode 102 while a high-frequency voltage is applied. Thus, continuous processing can be performed. In the example in FIG. 2, the modification-treated surface 11 is formed on the principal surface on the curved plate-shaped electrode 103 side of the original film 107. The original film 107 after the processing is wound around a winding roll 109.

The fluorine resin film 1 can be used, for example, as a coating film for coating the surface of a rubber-containing substrate included in a molded rubber body. The coating film is usually used so as to conform to the shape of the surface of the rubber-containing substrate. In this case, the coating film is forced to be strongly stretched depending on the above shape. Further, according to the shaping process which is performed in a state where the fluorine resin film 1 is placed in a mold, the degree to which the fluorine resin film 1 is stretched during the rubber shaping is high.

Examples of the molded rubber body include a diaphragm, a roller, a sealing member (a gasket, an O-ring, a valve member, and the like), and a tubular body (a tube, a hose, and the like). Specific examples of the molded rubber body are shown below. However, the molded rubber body is not limited to the above examples and the following specific examples.

The application of the fluorine resin film 1 is not limited to the above examples.

[Molded Rubber Body]

Figure 3A:
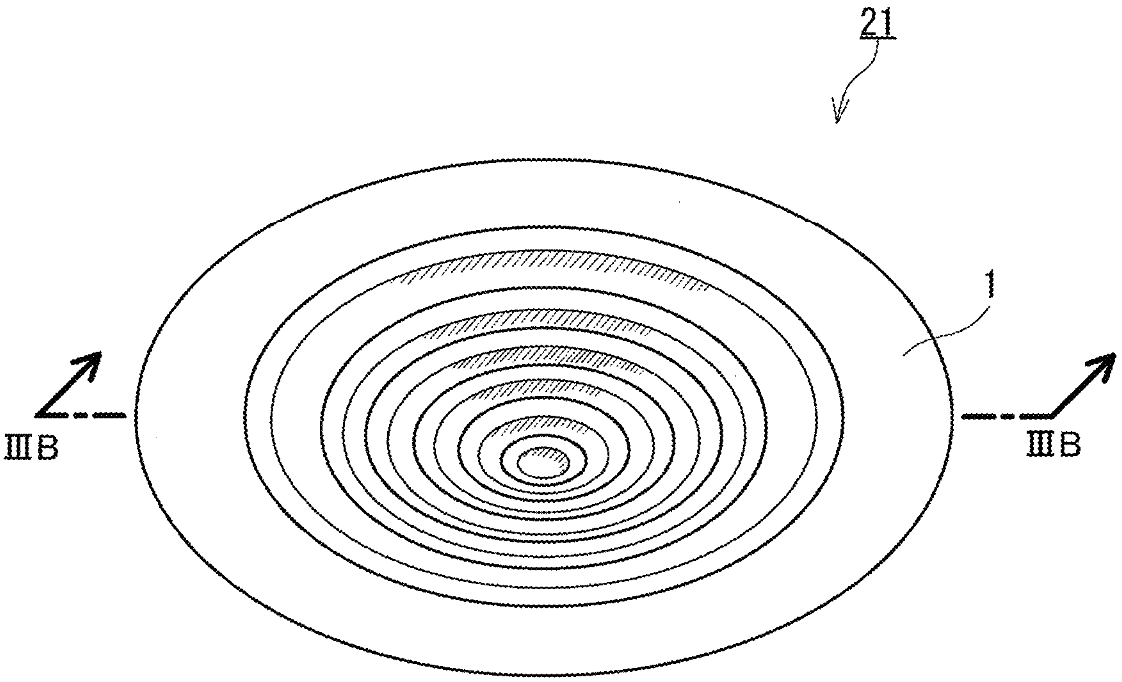
FIG. 3A is a plan view schematically showing an example of a molded rubber body of the present invention.
Figure 3B:
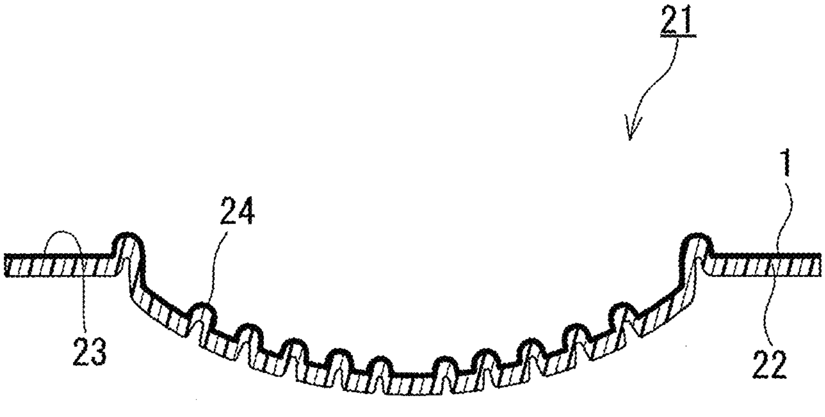
FIG. 3B is a cross-sectional view showing a cross section IIIB-IIIB of the molded rubber body in FIG. 3A.

FIG. 3A and FIG. 3B show an example of the molded rubber body of the present embodiment. In FIG. 3B, a cross section IIIB-IIIB of a molded rubber body 21 in FIG. 3A is shown. The molded rubber body 21 in FIG. 3A and FIG. 3B is a corrugated diaphragm. The molded rubber body 21 includes a rubber-containing substrate 22 and the fluorine resin film 1. The rubber-containing substrate 22 has a surface 23 coated with the fluorine resin film 1. The surface 23 is corrugated, and accordingly the fluorine resin film 1 is strongly stretched partially (e.g., at a crest 24 of the corrugation) during the manufacture of the molded rubber body 21.

The entire surface of the molded rubber body 21 may be the surface 23, or a part of the surface of the molded rubber body 21 may be the surface 23.

The rubber-containing substrate 22 usually contains a rubber as its main component. Examples of the rubber include a butyl rubber, a natural rubber, an ethylene propylene rubber (EPDM), a silicone rubber, and a fluorine rubber. The rubber-containing substrate 22 can contain a material in addition to the rubber, for example, an inorganic filler, an organic filler, a reinforcing fiber, an antioxidant, and/or a plasticizer.

The molded rubber body of the present invention is not limited to the above examples and may be any molded rubber body having the surface 23. The molded rubber body other than a diaphragm is, for example, a roller, a sealing member (a gasket, an O-ring, a valve member, and the like), and a tubular body (a tube, a hose, and the like).

Figure 4A:
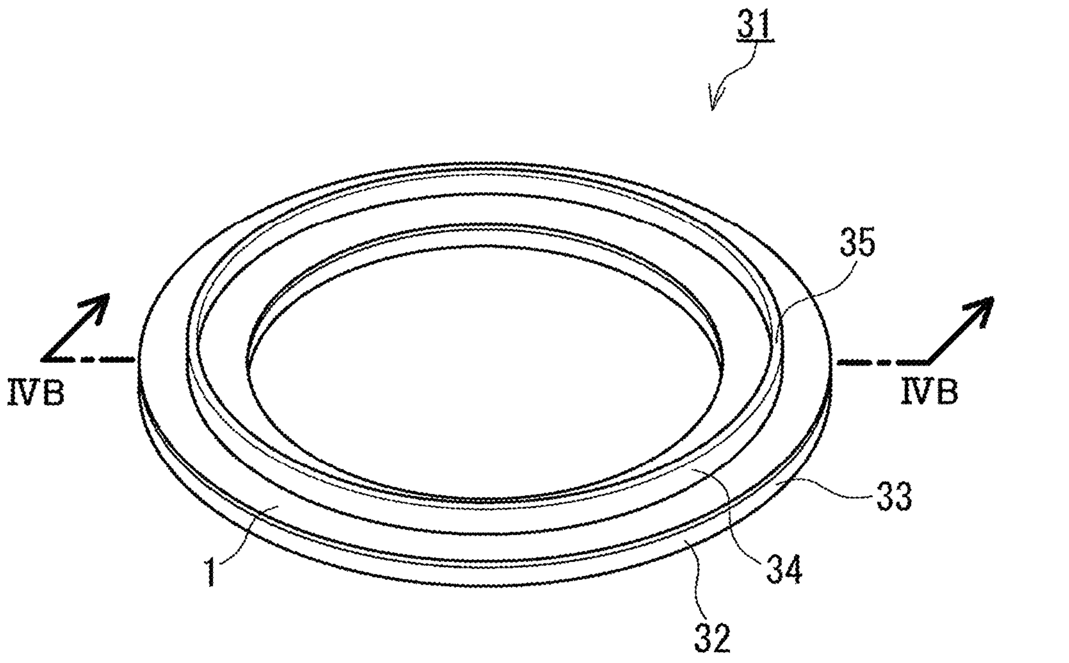
FIG. 4A is a plan view schematically showing an example of the molded rubber body of the present invention.
Figure 4B:
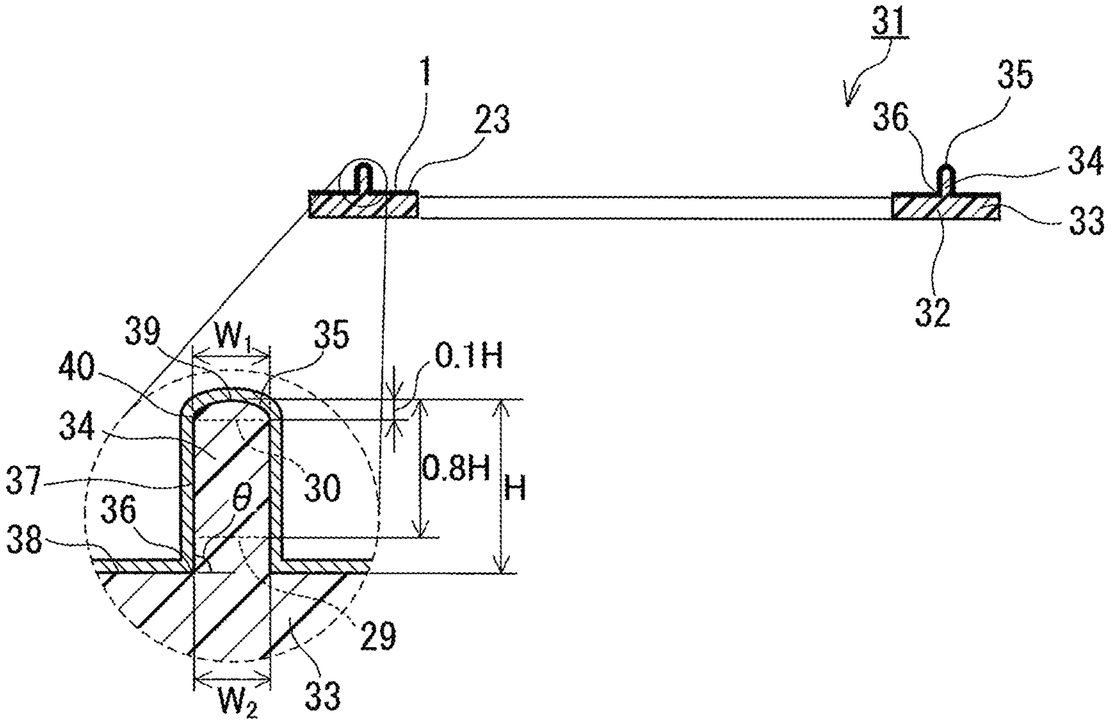
FIG. 4B is a cross-sectional view showing a cross section IVB-IVB of the molded rubber body in FIG. 4A.

FIG. 4A and FIG. 4B show another example of the molded rubber body of the present embodiment. In FIG. 4B, a cross section IVB-IVB of a molded rubber body 31 in FIG. 4A and a partially enlarged view of the vicinity of a protrusion 34 are shown. The molded rubber body 31 in FIG. 4A and FIG. 4B is a gasket. The molded rubber body 31 has the surface 23 coated with the fluorine resin film 1. A rubber-containing substrate 32 of the molded rubber body 31 includes a base portion 33 and the protrusion 34 protruding from the base portion 33. The surface 23 includes the surface of the protrusion 34. During the manufacture of the molded rubber body 31, the fluorine resin film 1 is strongly stretched partially, for example, at the surface of the protrusion 34 (especially, a top portion 35 of the protrusion 34 or a connecting portion 40 connecting the top portion 35 and a lateral wall portion 37 to each other) or at a connecting portion 36 connecting, in the base portion 33, a face 38 from which the protrusion 34 protrudes and the lateral wall portion 37 of the protrusion 34 to each other. However, in the molded rubber body 31 including the fluorine resin film 1, a tear is less prone to occur in the fluorine resin film 1, even in its portion that is strongly stretched during the manufacture.

The protrusion 34 may have a height H of 8 mm or more, 10 mm or more, 12 mm or more, 13 mm or more, or even 14 mm or more. In these aspects, especially in the aspect where the protrusion 34 has a height H of 10 mm or more, the degree to which the fluorine resin film 1 is stretched partially during the manufacture of the molded rubber body 31 is further increased.

The fluorine resin film 1 may coat the protrusion 34 from the top portion 35 of the protrusion 34 in the direction of the height H of the protrusion 34. The coating may reach the connecting portion 36, or may extend to the face 38 of the base portion 33 beyond the connecting portion 36. The fluorine resin film 1 may coat the entire surface or a part of the surface of the protrusion 34. In other words, the surface 23 may include the entire surface or a part of the surface of the protrusion 34.

The protrusion 34 may have a width $W_1$ of 50 mm or less, 20 mm or less, or even 10 mm or less. The lower limit for the width $W_1$ is, for example, 3 mm or more. The smaller the width $W_1$ is, the more the degree to which the fluorine resin film 1 is stretched partially during the manufacture of the molded rubber body 31 is further increased. The width $W_1$ is the minimum width in a cross section 30 of the protrusion 34 taken parallel to the face 38 of the base portion 33, where the cross section 30 is at a distance of 0.1 times the height H (0.1 H) of the protrusion 34 from a tip 39 of the protrusion 34.

The protrusion 34 may have a width $W_2$ of 50 mm or less, 20 mm or less, or even 10 mm or less. The lower limit for the width $W_2$ is, for example, 4 mm or more. The smaller the width $W_2$ is, the more the degree to which the fluorine resin film 1 is stretched partially during the manufacture of the molded rubber body 31 is further increased. The width $W_2$ is defined as the minimum distance between two parallel tangent lines sandwiching therebetween a cross section 29 of the protrusion 34 taken parallel to the face 38 of the base portion 33, where the cross section 29 is at a distance of 0.8 times the height H (0.8H) of the protrusion 34 from the tip 39 of the protrusion 34.

The ratio $W_1/W_2$ of the width $W_1$ to the width $W_2$ may be 0.5 to 2.0, 0.75 to 1.33, or even 0.85 to 1.18.

The maximum value of an inclination angle θ formed by the lateral wall portion 37 of the protrusion 34 relative to the face 38 of the base portion 33 may be 60 degrees or more, 70 degrees or more, 80 degrees or more, or even 90 degrees or more. The upper limit for the above maximum value is, for example, 110 degrees or less. The larger the above maximum value is, the more the degree to which the fluorine resin film 1 is stretched partially during the manufacture of the molded rubber body 31 is further increased.

The molded rubber body 31 may include the two or more protrusions 34. The surface 23 may include the surfaces of the two or more protrusions 34. The fluorine resin film 1 may continuously or individually coat the two or more protrusions 34. The interval between the two or more protrusions 34 (distance between the tips 39) may be 50 mm or less, 20 mm or less, or even 15 mm or less.

Figure 5A:
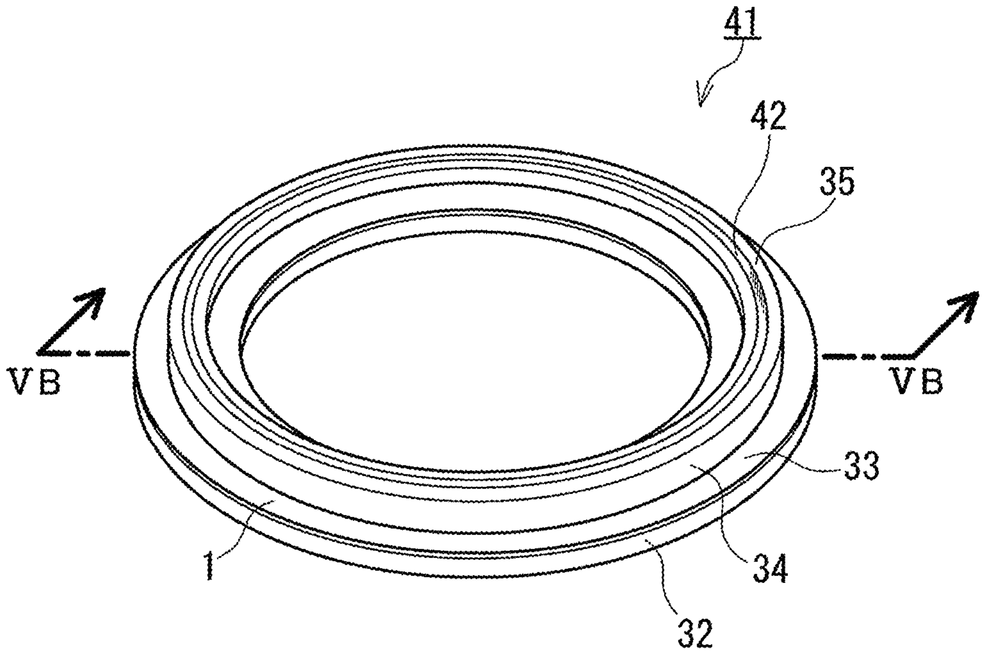
FIG. 5A is a plan view schematically showing an example of the molded rubber body of the present invention.
Figure 5B:
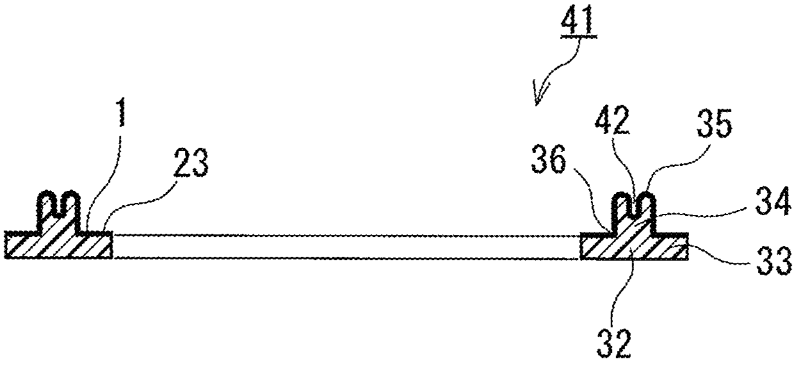
FIG. 5B is a cross-sectional view showing a cross section VB-VB of the molded rubber body in FIG. 5A.

FIG. 5A and FIG. 5B show another example of the molded rubber body of the present embodiment. In FIG. 5B, a cross section VB-VB of a molded rubber body 41 in FIG. 5A is shown. The molded rubber body 41 in FIG. 5A and FIG. 5B is a gasket. The molded rubber body 41 has the configuration similar to that of the molded rubber body 31 except the difference in shape of the protrusion 34. The protrusion 34 of the molded rubber body 41 has a recess 42 at its top portion 35. The fluorine resin film 1 coats the protrusion 34 from the top portion 35 of the protrusion 34 in the direction of the height H of the protrusion 34 so as to include the recess 42. In this aspect, the degree to which the fluorine resin film 1 is stretched partially during the manufacture of the molded rubber body 31 is further increased. The fluorine resin film 1 may coat the entire surface or a part of the surface of the recess 42.

In the molded rubber bodies 21, 31, and 41, the fluorine resin film 1 can be in a tear-free state.

The molded rubber bodies 21, 31, and 41 can be manufactured, for example, by performing a shaping process of a rubber in a state where the fluorine resin film 1 is placed in a mold. This aspect of the present invention provides a method for manufacturing a molded rubber body including a resin film and a rubber-containing substrate having a surface coated with the resin film, the method including performing a shaping process of a rubber in a state where the resin film is placed in a mold, thereby obtaining the molded rubber body, wherein the resin film is the fluorine resin film 1.

Examples of the shaping process include in-mold molding and film insert molding. However, the shaping process is not limited to the above examples.

By using the fluorine resin film 1 for manufacturing the molded rubber bodies 21, 31, and 41, a molded rubber body may be obtained in a state where the fluorine resin film 1 has no tear, where in the molded rubber body, the surface 23 includes the surface of the protrusion 34 protruding from the base portion 33 of the rubber-containing substrate 32, the protrusion 34 has a height of 10 mm or more, and the fluorine resin film 1 coats the protrusion 34 from the top portion 35 of the protrusion 34 in the direction of the height H of the protrusion 34. This aspect of the present invention provides a method for manufacturing a molded rubber body including a resin film and a rubber-containing substrate having a surface coated with the resin film, wherein in the molded rubber body, the resin film is a fluorine resin film and has no tear, the surface includes a surface of a protrusion protruding from a base portion of the rubber-containing substrate, the protrusion has a height of 10 mm or more, and the resin film coats the protrusion from a top portion of the protrusion in a height direction of the protrusion, and the method includes performing a shaping process of a rubber in a state where the fluorine resin film 1 is placed in a mold, thereby obtaining the molded rubber body.

The molded rubber body according to the present embodiment is a molded rubber body that includes the fluorine resin film 1 and the rubber-containing substrate 32 having the surface 23 coated with the fluorine resin film 1, the surface 23 includes the surface of the protrusion 34 protruding from the base portion 33 of the rubber-containing substrate 32, the protrusion 34 has a height of 10 mm or more, and the fluorine resin film 1 coats, without tearing, the surface of the protrusion 34 from the top portion 35 of the protrusion 34 in the direction of the height H of the protrusion 34. According to the present embodiment, the molding method using a mold makes it possible to provide a molded rubber body in which a fluorine resin film coats, without tearing, the surface of a protrusion having the height as large as the above. This aspect of the present invention provides a method for manufacturing a molded rubber body including a resin film and a rubber-containing substrate having a surface coated with the resin film, wherein in the molded rubber body, the resin film is a fluorine resin film and has no tear, the surface includes a surface of a protrusion protruding from a base portion of the rubber-containing substrate, the protrusion has a height of 10 mm or more, and the resin film coats the protrusion from a top portion of the protrusion in a height direction of the protrusion, and the method includes performing a shaping process of a rubber in a state where the resin film is placed in a mold, thereby obtaining the molded rubber body, and the resin film used is a resin film having a tensile elongation at break such that no tear occurs in changing the resin film from a film state to a shape conforming to a recess of the mold in a depth direction of the recess of the mold, the recess corresponding to the protrusion.

The tensile elongation at break such that no tear occurs can be determined on the basis of the shape of the recess of the mold (e.g., a depth D of the recess, the opening dimension, or the ratio of the depth D to the opening dimension), the temperature for the shaping process, the pressing force, and so on. As shown in the following examples, in the fluorine resin film, it is important to give priority to an achievement of a sufficient tensile elongation at break over an achievement of the tensile strength and the tensile elongation at break at the same time.

EXAMPLES

The present invention will be more specifically described below with reference to examples. The present invention is not limited to the following examples.

First, the method for evaluating fluorine resin films will be described.

[Thickness]

The thickness was determined as the average value of values at four or more measurement points with a micrometer (manufactured by Mitutoyo Corporation).

[Tensile Elongation at Break and Tensile Strength]

The mechanical properties (tensile elongation at break and tensile strength) based on the tensile test were evaluated as follows. The fluorine resin film was punched into Dumbbell shape No. 3 specified in JIS K 6251: 2017 to obtain a test specimen. Next, to reduce elongation of a portion other than the parallel portion (portion between the gauge lines) of the test specimen during the test, the range of 35 mm from each of both the end portions in the longitudinal direction of the test specimen was reinforced with a reinforcing tape (No. 360UL manufactured by NITTO DENKO CORPORATION). The reinforcement was performed by attaching the reinforcing tape to one side of the test specimen. Next, a tensile test was performed on the test specimen with a tensile testing machine (Tensilon universal testing machine manufactured by ORIENTEC CO., LTD.). The test temperature was set to 180° C. (started after preheating the test specimen for 5 minutes), and the tensile speed was set to 200 mm/min. The tensile test was performed for each of the MD (winding direction during film formation; longitudinal direction) and the TD (width direction) of the fluorine resin film. The ratio $L_1/L_0$ of a length $L_1$ of the test specimen at the break point to a length $L_0$ of the test specimen before the test was determined, and this ratio was defined as the tensile elongation at break (unit: %). In addition, regarding the tensile test for the MD, the maximum stress (tensile force) recorded until the break of the test specimen was divided by the cross-sectional area of the parallel portion of the test specimen before the test. Thus, the tensile strength (unit: MPa) was determined.

[Peel Strength]

The peel strength was evaluated as follows. First, the fluorine resin film was cut in a rectangular shape having a width of 19 mm and a length of 150 mm to obtain a test specimen. Next, the test specimen was attached to the surface of a stainless steel plate with a double-sided adhesive tape (No. 500 manufactured by NITTO DENKO CORPORATION). The attachment was performed so that the entire test specimen was in contact with the stainless steel plate and so that the modification-treated surface of the fluorine resin film was exposed. The double-sided adhesive tape selected was one with an enough adhesive force to prevent a peel-off of the test specimen from the stainless steel plate during the evaluation. Next, to the exposed surface of the test specimen, a single-sided adhesive tape (No. 31B manufactured by NITTO DENKO CORPORATION, 80 μm thick, acrylic adhesive) having a width of 19 mm and a length of 200 mm was attached. The attachment was performed so as to satisfy the following requirements that: the long side of the test specimen and the long side of the single-sided adhesive tape coincide with each other; one end portion in the longitudinal direction of the single-sided adhesive tape is a free end over the length of 120 mm without being in contact with the test specimen; and the entire adhesive layer of the single-sided adhesive tape excluding the above free end is in contact with the test specimen. Moreover, in the attachment, to further reliably join the single-sided adhesive tape and the test specimen to each other, a pressure-bonding roller having a mass of 2 kg specified in JIS Z 0237: 2009 was reciprocated once at a temperature of 25° C. Next, to stabilize the joining between the single-sided adhesive tape and the test specimen, the test sample was allowed to stand for 30 minutes after the reciprocation of the pressure-bonding roller. Then, the test specimen was set in a tensile testing machine. The setting was performed so as to satisfy the following requirements that: the longitudinal direction of the test specimen coincides with the direction between the chucks of the testing machine; one chuck of the testing machine holds the above free end of the single-sided adhesive tape while the other chuck holds the test specimen and the stainless steel plate. Next, a 180° peel test was performed in which the single-sided adhesive tape was peeled off from the test specimen at the peel angle of 180° and the test speed of 300 mm/min. The measured value for the length of the initial 20 mm peeled off after the start of the test was ignored. Then, the average value of the measured values for the length of 60 mm peeled off was determined as the peel strength of the test specimen. The test was performed in an environment at a temperature of 25±1° C. and a relative humidity of 50±5%.

[MFR]

The MFR of ETFE contained in each of the fluorine resin films of the examples and Comparative Examples 1 and 2 was measured in accordance with ASTM D3159-20 (melting temperature of 297° C. and load of 5 kg), which is the industrial standard for ETFE. The MFR of PFA contained in the fluorine resin film of Comparative Example 3 was calculated by measuring the weight (g) of PFA flowing out per unit time (10 minutes) through a nozzle having a diameter of 2 mm and a length of 8 mm under the measurement conditions of the melting temperature of 372° C. and the load of 2 kg. The MFR of FEP contained in the fluorine resin film of Comparative Example 4 was determined in accordance with ASTM D2216 (melting temperature of 372° C. and load of 5 kg), which is the industrial standard for FEP.

[Melting Point]

The melting point of the fluorine resin contained in the fluorine resin film was evaluated by DSC as follows. An amount of 10±5 mg of the fluorine resin film was placed in the lower plate of an aluminum pan, covered with the upper plate, and vertically pressed to be sealed under pressure. Next, the fluorine resin was held at 0° C. for 1 minute, then raised in temperature to 260° C. at a rate of temperature rise of 10° C./min, held at 260° C. for 1 minute, and then dropped in temperature to 0° C. at a rate of temperature drop of 10° C./min (first run). Next, the fluorine resin was held at 0° C. for 1 minute, then raised again in temperature to 260° C. at a rate of temperature rise of 10° C./min (second run). The melting peak temperature at that time was determined as the melting point of the fluorine resin. The DSC apparatus and analysis software used were respectively DSC200F3 and Proteus software manufactured by NETZSCH Japan K.K.

[Shaping Test]

A rubber shaping process simulating in-mold molding was performed by using the fluorine resin film, and a visual check was performed as to whether a tear had occurred in the fluorine resin film coating the surface of the resultant molded rubber body. The shaping process was performed by the following procedure.

The fluorine resin film and an unvulcanized butyl rubber sheet (durometer hardness of 28 evaluated by Type A durometer) were overlaid each other and placed on the molding face of a mold having two or more recesses each corresponding to the protrusion 34 of the gasket. The recesses had the same shape and each had a rectangular opening, a rectangular cross section (cross-sectional area of 10 mm$^2$), and a depth of 15 mm. The placement was performed so that the modification-treated surface of the fluorine resin film was in contact with the butyl rubber sheet and so that the fluorine resin film was on the mold side. Next, a shaping process was performed with a high-temperature and high-pressure press (high-temperature heating and pressing device MKP-1500D-WH-ST manufactured by MIKADO TECHNOS CO., LTD.) under the conditions of the temperature of 170° C., the pressing forces of 20 kN×5 seconds (pressure molding) followed by 4.5 kN×10 minutes (vulcanization). Thus, a molded rubber body was obtained that had two or more protrusions (height H=15 mm) protruding from a base portion, corresponding to the recesses of the mold, and having surfaces entirely coated with the fluorine resin film. The protrusions of the obtained molded rubber body were visually checked, and the case where no tear had occurred in the fluorine resin film was evaluated as good, and the case where a tear had occurred was evaluated as unacceptable.

Example 1

An ETFE resin (LM-720AP manufactured by AGC Inc.) was subjected to molding by melt extrusion to form an ETFE film having a thickness of 50 μm. Next, one side of the ETFE film was subjected to a surface modification treatment by a sputter etching treatment to obtain a fluorine resin film of Example 1. The same conditions for the sputter etching treatment were set in all the fluorine resin films of the examples and the comparative examples.

Example 2

A fluorine resin film of Example 2 was obtained in the same manner as in Example 1, except that an ETFE film having a thickness of 100 μm was formed.

Example 3

A fluorine resin film of Example 3 was obtained in the same manner as in Example 2, except that the lot of the ETFE resin (LM-720AP manufactured by AGC Inc.) was changed.

Example 4

A fluorine resin film of Example 4 was obtained in the same manner as in Example 1, except that an ETFE film having a thickness of 200 μm was formed.

Example 5

A fluorine resin film of Example 5 was obtained in the same manner as in Example 1, except that LM-730AP manufactured by AGC Inc. was used as the ETFE resin.

Example 6

A fluorine resin film of Example 6 was obtained in the same manner as in Example 5, except that the lot of the ETFE resin (LM-730AP manufactured by AGC Inc.) was changed and an ETFE film having a thickness of 100 μm was formed.

Comparative Example 1

A fluorine resin film of Comparative Example 1 was obtained in the same manner as in Example 1, except that EP-546 manufactured by DAIKIN INDUSTRIES, LTD. was used as the ETFE resin.

Comparative Example 2

A fluorine resin film of Comparative Example 2 was obtained in the same manner as in Comparative Example 1, except that an ETFE film having a thickness of 100 μm was formed.

Comparative Example 3

A PFA resin (920HP Plus manufactured by DuPont) was subjected to molding by melt extrusion to form a PFA film having a thickness of 45 μm. Next, one side of the PFA film was subjected to a surface modification treatment by a sputter etching treatment to obtain a fluorine resin film of Comparative Example 3.

Comparative Example 4

One side of an FEP film (NF-0050 manufactured by Daikin Industries, Ltd.) having a thickness of 50 μm was subjected to a surface modification treatment by a sputter etching treatment to obtain a fluorine resin film of Comparative Example 4.

The evaluation results of each of the fluorine resins and the fluorine resin films are shown in Tables 2 and 3 below. In addition, FIG. 6 and FIG. 7 respectively show, for Example 1 and Comparative Example 1, enlarged observation images of the protrusions in the molded rubber bodies obtained by the shaping test.

TABLE 2

| | | Fluorine resin | | |
|---|---|---|---|---|
| | | Type | MFR (g/10 min) | Melting point (° C.) |
| Example | 1 | ETFE | 15.1 | 225.2 |
| | 2 | ETFE | 15.1 | 225.2 |
| | 3 | ETFE | 20.0 | 225.8 |
| | 4 | ETFE | 15.1 | 225.2 |
| | 5 | ETFE | 26.0 | 225.2 |
| | 6 | ETFE | 23.0 | 225.2 |
| Comparative Example | 1 | ETFE | 6.0 | 252.9 |
| | 2 | ETFE | 6.0 | 252.9 |
| | 3 | PFA | 2.0 | 310 |
| | 4 | FEP | 3.0 | 270 |

TABLE 3

| | | Fluorine resin film | | | | | | |
|---|---|---|---|---|---|---|---|---|
| | | | Tensile test (180° C. or less) | | | | | |
| | | Thickness (μm) | Elongation at break in MD (%) | Elongation at break in TD (%) | Average of elongation at break (%) | Tensile strength in MD (MPa) | Adhesive force (N/19 mm) | Shaping test |
| Example | 1 | 50 | 1650 | 1620 | 1635 | 10.0 | 7.81 | Good |
| | 2 | 100 | 1658 | 1627 | 1643 | 9.6 | 7.98 | Good |
| | 3 | 100 | 1698 | 1720 | 1709 | 8.5 | 7.84 | Good |
| | 4 | 200 | 1672 | 1640 | 1656 | 8.7 | 7.76 | Good |
| | 5 | 50 | 1428 | 1350 | 1389 | 7.8 | 7.18 | Good |
| | 6 | 100 | 1611 | 1594 | 1602 | 7.7 | 6.92 | Good |
| Comparative Example | 1 | 50 | 880 | 891 | 885 | 14.2 | 7.00 | Unacceptable |
| | 2 | 100 | 1080 | 1093 | 1086 | 12.3 | 7.00 | Unacceptable |
| | 3 | 45 | 711 | 782 | 746 | 27.9 | — | Unacceptable |
| | 4 | 50 | 576 | 590 | 583 | 7.5 | — | Unacceptable |

* Sign "—" in Table represents no measurement.

Figure 6:
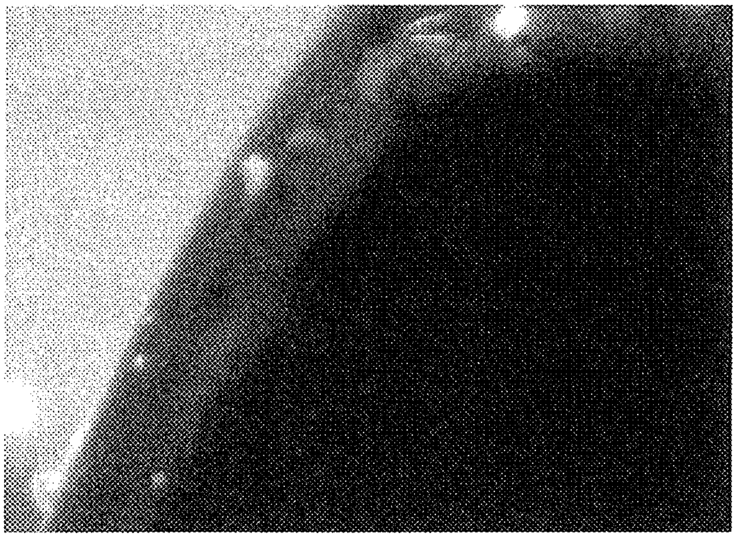
FIG. 6 is an observation image showing the state of a fluorine resin film of Example 1 after a shaping test.
Figure 7:
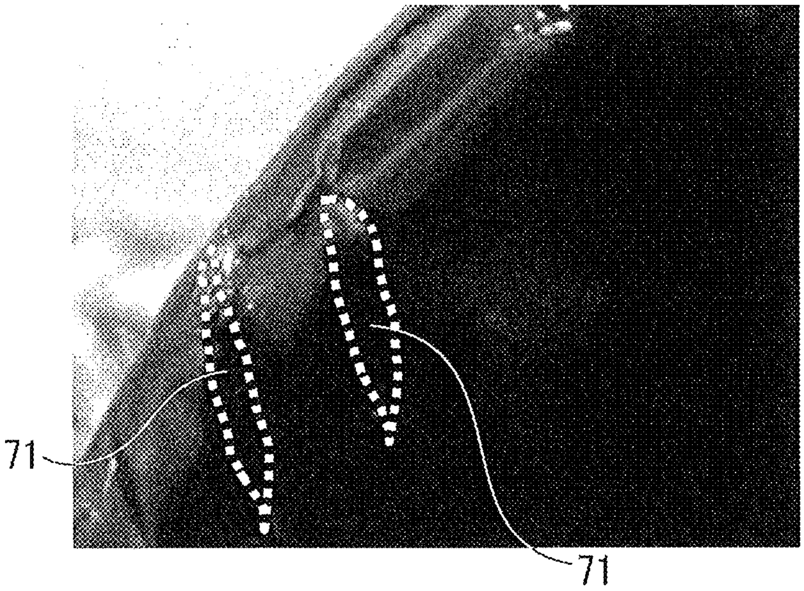
FIG. 7 is an observation image showing the state of a fluorine resin film of Comparative Example 1 after the shaping test.

As shown in Table 3, in the fluorine resin films of the examples, no tear occurred during the shaping test (see FIG. 6 for Example 1). On the other hand, in the fluorine resin films of the comparative examples, a tear occurred during the shaping test (see FIG. 7 for Comparative Example 1). As shown in FIG. 7, a plurality of tears 71 occurred in the protrusions.

INDUSTRIAL APPLICABILITY

The fluorine resin film of the present invention can be used, for example, as a coating film for coating the surface of a rubber-containing substrate included in a molded rubber body.

The invention claimed is:

1. A molded rubber body comprising:

a rubber-containing substrate; and a resin film, wherein the rubber-containing substrate has a surface coated with the resin film, the coated surface includes a surface of a protrusion protruding from a base portion of the rubber-containing substrate, and the protrusion has a recess at a top portion of the protrusion, wherein the resin film is a fluorine resin film comprising a fluorine resin, wherein the fluorine resin is an ethylene-tetrafluoroethylene copolymer, the fluorine resin film has an average value of 1300% or more and 1800% or less of a tensile elongation at break in a first direction and a tensile elongation at break in a second direction under a 180° C. atmosphere, the first direction and the second direction being in-plane directions and orthogonal to each other, and the fluorine resin film coats the protrusion, including the recess, from the top portion of the protrusion in a direction of a height of the protrusion.

2. The molded rubber body according to claim 1, wherein the fluorine resin film has a tensile strength of 7.0 MPa or more in the first direction and/or the second direction under the 180° C. atmosphere.

3. The molded rubber body according to claim 1, wherein the fluorine resin film has a tensile strength of 20.0 MPa or less in the first direction and/or the second direction under the 180° C. atmosphere.

4. The molded rubber body according to claim 1, wherein the fluorine resin has a melting point of 250° C. or less evaluated by differential scanning calorimetry (DSC).

5. The molded rubber body according to claim 1, wherein the fluorine resin film includes a surface subjected to a modification treatment.

6. The molded rubber body according to claim 5, wherein the surface has an adhesiveness of 4.0 N/19 mm or more expressed as a peel strength evaluated by a 180° peel test, where the 180° peel test is performed by attaching the fluorine resin film and an adhesive tape (No. 31B manufactured by NITTO DENKO CORPORATION, 80 μm thick) to each other so that an adhesive surface of the adhesive tape and the surface are in contact with each other, and then peeling off the adhesive tape from the fluorine resin film.

7. The molded rubber body according to claim 1, wherein the fluorine resin film has a thickness of 10 to 300 μm.

8. The molded rubber body according to claim 1, wherein the protrusion has a height of 10 mm or more.

9. The molded rubber body according to claim 1, wherein the fluorine resin film has a tensile strength of 7.0 MPa or more and 12.0 MPa or less in the first direction and/or the second direction under a 180° C. atmosphere.

10. The molded rubber body according to claim 1, wherein the fluorine resin has a melt flow rate of 7 g/10 min or more.

11. The molded rubber body according to claim 1, wherein the protrusion has a height of 14 mm or more.

* * * * *